United States Patent [19]

Weber et al.

[11] 4,456,545
[45] Jun. 26, 1984

[54] DICHROITIC ANTHRAQUINONE DYESTUFFS USEFUL IN LIQUID CRYSTALLINE DIELECTRICS AND ELECTRO-OPTICAL INDICATOR ELEMENTS

[75] Inventors: Georg Weber, Erzhausen; Rudolf Eidenschink, Dieburg; Dietrich Erdmann, Darmstadt, all of Fed. Rep. of Germany

[73] Assignee: Merck Patent Gesellschaft mit beschränkter Haftung, Darmstadt, Fed. Rep. of Germany

[21] Appl. No.: 314,304

[22] Filed: Oct. 23, 1981

[30] Foreign Application Priority Data

Oct. 24, 1980 [DE] Fed. Rep. of Germany ....... 3040102

[51] Int. Cl.$^3$ ................. C02F 1/13; C09K 3/34; C09B 1/00
[52] U.S. Cl. ................. 252/299.1; 260/378; 260/380; 260/383; 350/349
[58] Field of Search ............. 252/299.1; 350/349; 260/378, 380, 383

[56] References Cited

U.S. PATENT DOCUMENTS

| | | | |
|---|---|---|---|
| 4,232,950 | 11/1980 | Benham | 252/299.1 |
| 4,273,929 | 6/1981 | Boller et al. | 252/299.1 |
| 4,304,683 | 12/1981 | Morinaka et al. | 252/299.1 |
| 4,358,392 | 11/1982 | Cognard | 252/299.1 |
| 4,360,447 | 11/1982 | Morinaka et al. | 252/299.1 |
| 4,363,743 | 12/1982 | Mueller et al. | 252/299.1 |
| 4,376,715 | 2/1983 | Cognard et al. | 252/299.1 |

FOREIGN PATENT DOCUMENTS

| | | | |
|---|---|---|---|
| 189355 | 6/1981 | Czechoslovakia | 260/380 |
| 2104 | 5/1979 | European Pat. Off. | 252/299.1 |
| 25809 | 4/1981 | European Pat. Off. | 252/299.1 |
| 26004 | 4/1981 | European Pat. Off. | 252/299.1 |
| 34832 | 9/1981 | European Pat. Off. | 252/299.1 |
| 38460 | 10/1981 | European Pat. Off. | 252/299.1 |
| 49036 | 4/1982 | European Pat. Off. | 252/299.1 |
| 76633 | 4/1983 | European Pat. Off. | 252/299.1 |
| 2657997 | 7/1977 | Fed. Rep. of Germany | 260/380 |
| 2657996 | 7/1977 | Fed. Rep. of Germany | 260/380 |
| 2920730 | 11/1979 | Fed. Rep. of Germany | 252/299.1 |
| 3009974 | 9/1980 | Fed. Rep. of Germany | 252/299.1 |
| 3028593 | 2/1981 | Fed. Rep. of Germany | 252/299.1 |
| 3036853 | 4/1981 | Fed. Rep. of Germany | 252/299.1 |
| 3038372 | 5/1981 | Fed. Rep. of Germany | 252/299.1 |
| 894338 | 4/1962 | United Kingdom | 260/380 |
| 1017869 | 1/1966 | United Kingdom | 260/380 |
| 1024036 | 3/1966 | United Kingdom | 260/380 |
| 1048882 | 11/1966 | United Kingdom | 260/380 |
| 1063976 | 4/1967 | United Kingdom | 260/380 |
| 1073282 | 6/1967 | United Kingdom | 260/380 |
| 1121745 | 7/1968 | United Kingdom | 260/380 |
| 1334706 | 10/1973 | United Kingdom | 260/380 |
| 1342549 | 1/1974 | United Kingdom | 260/380 |
| 2011940 | 7/1979 | United Kingdom | 252/299.1 |
| 2037803 | 7/1980 | United Kingdom | 252/299.1 |
| 2051113 | 1/1981 | United Kingdom | 260/380 |
| 2069518 | 8/1981 | United Kingdom | 252/299.1 |
| 2071685 | 9/1981 | United Kingdom | 252/299.1 |
| 2074182 | 10/1981 | United Kingdom | 252/299.1 |
| 260042 | 12/1969 | U.S.S.R. | 260/380 |
| 259908 | 12/1969 | U.S.S.R. | 260/380 |
| 271698 | 5/1970 | U.S.S.R. | 260/380 |

OTHER PUBLICATIONS

Saeua, F. D., Xerox Disclosure J., vol. 1, No. 9/10, pp. 61–62, (9/10 1976).
Cognaro, J. et al., Mol. Cryst. Liq. Cryst, vol. 70, pp. 1–19, (1981).
Krasnosel'Skaya, M. I. et al., Zh. Org. Khim, vol. 8, No. 11, pp. 2379–2382, (1972).
Ca, vol. 80, 132301k, 132302m, (1974).
Ca, vol. 77, 61659h, (1972).
Ca, vol. 73, 131973z, (1970).

*Primary Examiner*—Teddy S. Gron
*Attorney, Agent, or Firm*—Millen & White

[57] ABSTRACT

New dichroitic dyestuffs useful as components of liquid crystalline dielectrics for electro-optical indicator elements based on the guest-host effect have the formula

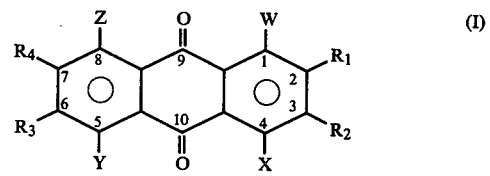

wherein W, X, Y and Z each is hydrogen, $NH_2$, OH, $NHCH_3$ or $NHC_2H_5$, provided that not more than 3 of these are the same, and one or two of $R_1$, $R_2$, $R_3$ and $R_4$ are a group of the formulae (IIa), (IIb), (IIc), (IId) or (IIe)

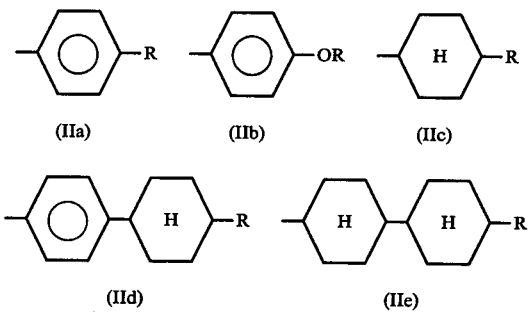

and the others are hydrogen, R being alkyl of 1–12 carbon atoms.

18 Claims, No Drawings

DICHROITIC ANTHRAQUINONE DYESTUFFS USEFUL IN LIQUID CRYSTALLINE DIELECTRICS AND ELECTRO-OPTICAL INDICATOR ELEMENTS

BACKGROUND OF THE INVENTION

The present invention concerns new dichroitic anthraquinone dyestuffs which are useful as components of liquid crystalline dielectrics for electro-optical indicator elements based on the guest-host effect.

For indicator elements based on liquid crystalline dielectrics, it is known to produce the electro-optical effect of the indication by incorporation of dichroitic or pleochroitic dyestuffs as a so-called "guest phase" in a liquid crystalline matrix which is the "host phase" (See G. H. Heilmeier et al., Molecular Crystals and Liquid Crystals, Volume 8 (1969), pages 293-304, for example, whose disclosure is incorporated by reference herein). The dyestuff molecules of the guest phase are oriented by the embedding host phase in which they are dissolved or distributed, corresponding to the applied electrical field. Because of their pleochroitic properties, depending upon the orientation, they exhibit a differing light absorption. Thus, in contrast to normal monochloritic dyestuffs, the amount of light absorbed by pleochroitic dyestuffs depends upon the orientation of their molecules to the electrical field vector of the incident light. Since application of an electric field to the dielectric distributed in a cell as a thin layer effects a reorientation of the nematic liquid crystals of the host phase, the pleochroitic dyestuffs embedded therein as a guest phase, are reorientated therewith. This leads to a change in their light absorption. The practical use of this technique, referred to in the literature as the guest-host effect, is described e.g., in published Federal Republic of Germany patent application No. 1,928,003, which is incorporated by reference herein. Examples of pleochroitic or dichroitic dyestuffs described there include indophenol blue, indigo derivatives, azo dyestuffs and the like. However, the contrast achieved with such ingredients is only sufficient for good readability when a polarization foil is used.

According to a more recent development, described, e.g., in published Federal Republic of Germany patent application No. 2,410,557, which is incorporated by reference herein, the polarizer can be omitted when, to the dielectric composed of nematic liquid crystals with positive dielectric anisotropy (as host phase) and pleochroitic dyestuff (as guest phase) incorporated therein, there is added a small amount, e.g., 0.1–15 wt %, of an optically-active material which brings about a helical structure (cholesteric structure) formation in the liquid crystal. Examples of such compositions, as well as the physical bases of the light absorption therein, are described in the work of D. L. White and G. N. Taylor entitled "New Absorptive Mode Reflective Liquid Crystal Display Device" (J. Appl. Physics, Volume 45 (1974), pages 4718-4723), which is incorporated by reference herein. Examples of the construction and operation of electro-optical indicator elements based on this effect are described in published Federal Republic of Germany patent application Nos. 2,639,675 and 2,658,568, which are incorporated by reference herein.

In the literature, liquid crystal indicator elements having cholesteric oriented host phase and dyestuff embedded therein as guest phase are frequently referred to as cholesteric guest-host displays. These CGH indicator elements have proved to be advantageous because, without polarization foils, they provide good indicator contrast and, in addition, have a greater brightness of the depicted image.

Choosing suitable dyestuffs for CGH indicator elements has proven to be very difficult. The dichroitic comparative values of these systems having a host phase and dyestuff embedded therein as guest phase, must be sufficiently great in order to impart to the indicator cell a sufficient brightness and a sufficient contrast ratio. The achievable contrast depends upon the degree of order S of the dyestuff in the liquid crystalline matrix. The degree of order can be expressed by the relationship $$S = \tfrac{1}{2} \cdot \langle 3\cos^2\theta - 1 \rangle = (E_{II} - E_I)/(E_{II} + 2E_I)$$

wherein $\theta$ is the angle between the molecular longitudinal axis of the dyestuff molecule and the optical axis of the liquid crystal; $E_{II}$ and $E_I$ are the values of the extinction of the indicator element when the measurements are carried out in the parallel orientation ($E_{II}$) or the vertical orientation ($E_I$) of the liquid crystal molecules.

A value which is easier to deal with in everyday practice and which is related to the degree of order S, thereby relating to the technical usefulness of a dyestuff-liquid crystal combination, is the so-called dichroitic ratio V, which represents the quotient of the above-defined extinction values:

$$V = (E_{II}/E_I)$$

In technically and industrially useful dyestuff-liquid crystal combinations, the value of V lies at or above 5.

In practice, the degree of order of a dyestuff depends, in the first place, upon its chemical structure, as well as upon the nature of the liquid crystalline matrix. A number of examples of this is described by R. I. Cox in "Molecular Crystals and Liquid Crystals," Volume 55 (1979), pages 1-33, which is incorporated by reference herein.

Apart from the degree of order or the dichroitic ratio, still other parameters are, however, important for the use of a dyestuff in CGH indicator elements. An absorption maximum of the dyestuff must lie in the range of the visible wavelengths, i.e., between 400 and 700 nm, and the dyestuff must be stable in the doped host phase up to a temperature of about 100° C., against alternating voltages of up to 20 V, against radiation in the infra-red, visible and ultra-violet ranges and against the components of the liquid crystalline host phase. Furthermore, good solubility in the host phase and a high optical density are desirable.

However, the dyestuffs hitherto suggested for CGH indicator elements do not fulfill these requirements to a sufficient extent. In particular, the azo dyestuffs, which are preferred because of their dichroitic ratio and their absorption maxima and which are prevalently suggested for use in CGH indicator elements, have proven to be insufficiently stable against light or ultra-violet radiation (too low a photo-chemical stability). In some cases, they also are chemically unstable. On the other hand, the photochemical and chemical stability of anthraquinone dyestuffs, which is generally higher in comparison with azo dyestuffs, is known. Indeed, proposals have been made in the literature for the use of anthraquinone dyestuffs for CGH indicator elements. However, most of the previously suggested anthraquinone dyestuffs have too small a dichroitic ratio V to enable their technical and industrial use in CGH indicator elements.

In published British patent application No. 20 11 940, there are described substituted anthraquinone dyestuffs of the formula (A),

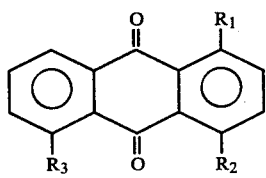

(A)

$R_1$ is an optionally ring-substituted aniline group attached via the nitrogen atom; $R_2$ is H or OH; and $R_3$ is H or, when $R_2$ is H, also an optionally substituted aniline group. The dichroitic ratio of these anthraquinone dyestuffs, measured in commercially available cyanobiphenyl/cyanoterphenyl liquid crystal mixtures, lies between 3.8 and 8.4, whereby most values lie between 5 and 6. However, the solubility of these dyestuffs in the most conventional liquid crystalline host phases is reduced by the aniline groups. In particular, in the liquid crystalline base materials of the phenylcyclohexane class, used today to a wide extent, the solubility of the dyestuffs of formula (A) is too low to meet practical requirements.

SUMMARY OF THE INVENTION

Accordingly, it is an object of the present invention to provide dichroitic dyestuffs which have sufficiently high solubility in the commercially available liquid crystalline base materials, for example to a minimum concentration of 0.5 wt. %, which have a dichroitic ratio $V \geq 5$, and which are substantially chemically and photochemically stable.

Upon further study of the specification and appended claims, further objects and advantages of this invention will become apparent to those skilled in the art.

These objects have been achieved by providing anthraquinone dyestuffs of formula (I)

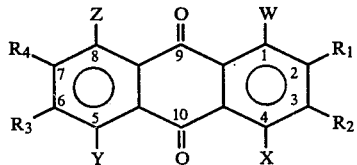

(I)

wherein W, X, Y and Z each independently is hydrogen, $NH_2$, OH, $NHCH_3$ or $NHC_2H_5$, provided that at most 3 of these groups are the same; and one or two of $R_1$, $R_2$, $R_3$ and $R_4$ are groups of the formulae (IIa), (IIb), (IIc), (IId) or (IIe)

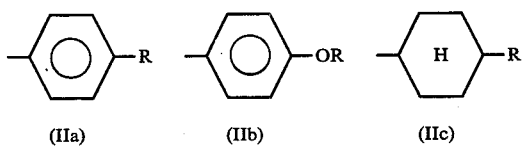

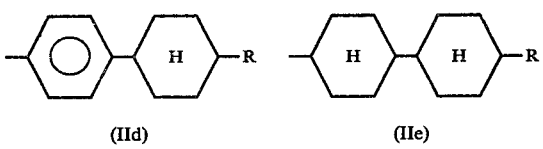

and the others are hydrogen, R being an alkyl group of 1–12 carbon atoms.

These compounds are surprisingly well soluble in the conventional liquid crystalline base materials and display good dichroitic ratio values therein.

Therefore, in one aspect, this invention relates to new anthraquinone dyestuffs of formula (I) and their use as components of liquid crystalline dielectrics. In another aspect, this invention relates to liquid crystalline dielectrics containing one or more dichroitic dyestuffs for electro-optical indicator elements based on the guest-host effect, and containing at least one anthraquinone dyestuff of formula (I). In yet another aspect, this invention relates to an electro-optical indicator element based on a guest-host liquid crystal cell in which the liquid crystalline dielectric contains an anthraquinone dyestuff of formula (I).

DETAILED DISCUSSION

In the compounds of formula (I), the substituents W, X, Y and Z are hydrogen, hydroxyl, amino, methylamino or ethylamino. Not more than three of these substituents can be the same. Among these, the compounds of formula (I) are preferred which contain not more than two, more preferably only one of the strongly polar groups OH or $NH_2$. Such compounds are more soluble in the usual liquid crystalline base materials, especially those with the phenylcyclohexane structure. Preferably, two of the substituents W, X, Y and Z are hydrogen and at least one methylamino or ethylamino; among these, those compounds of formula (I) are especially preferred in which either W and X or Y and Z are hydrogen.

With regard to $R_1$, $R_2$, $R_3$ and $R_4$, those compounds of formula (I) are preferred in which one of these groups is cyclohexylphenyl of the partial formula (IId) or cyclohexylcyclohexyl of the partial formula (IIe) and the other three radicals are hydrogen. Also well suited as guest dyestuffs in the scope of the present invention are those compounds in which one of $R_1$, $R_2$, $R_3$ and $R_4$ is a group of the partial formulae (IId) or (IIe) and a second one is 4-alkylphenyl (IIa), 4-alkoxyphenyl (IIb) or 4-alkylcyclohexyl (IIc); this second cyclic radical is preferably in the peri-position with respect to the first one, i.e., the two cyclic radicals are placed in the 2- and 6- or 3- and 7-positions of the anthraquinone base structure. The same arrangement is also preferred when two of $R_1$, $R_2$, $R_3$ and $R_4$ each signify a group of the partial formulae (IIa), (IIb) or (IIc).

The alkyl groups R in the partial formulae (IIa), (IIb), (IIc), (IId) and (IIe) contain 1–12, preferably 1–7 carbon atoms. When they contain 3 or more carbon atoms, these can be arranged in a straight or branched chain. However, those dyestuffs of the formula (I) in which R is a straight-chained alkyl group, are simpler to synthesize and, therefore, preferred. If, however, a branched alkyl group is contained in a compound of formula (I), e.g., for the alteration of solubility or for the production of optical activity, then such an alkyl radical is, as a rule, not branched more than once. Preferred branched groups of this kind are those in which a methyl or ethyl group is present in the 1- or 2-position of a longer carbon chain, for example 1-methylpropyl, 2-methylbutyl, 2-methylpentyl, 2-ethylhexyl, 1-methylheptyl or 2-methyloctyl. If two alkyl groups R are contained in a compound of formula (I), preferably at most one of them is branched.

The dyestuffs of formula (I) are prepared in the usual way for anthraquinone dyestuffs. A preferred synthesis involves the reaction of a substituted phthalic acid anhydride derivative of formula (III)

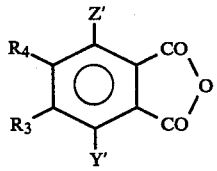

(III)

with a benzene derivative of formula (IV)

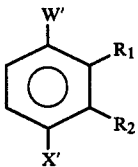

(IV)

in the manner of a Friedel-Crafts reaction in the presence of an acid catalyst. In formulae (III) and (IV), $R_1$, $R_2$, $R_3$ and $R_4$ are as defined for formula (I); W', X', Y' and Z' are as defined for W, X, Y and Z or are substituents convertible into these groups by simple reaction steps. The reaction conditions for the Friedel-Crafts reaction (solvent, catalyst, temperature, period) are selected in analogy to the preparation processes for structurally similar anthraquinone dyestuffs known from the literature. Details depend upon the structure and reactivity of the starting materials. The starting materials are, as a rule, known or can be prepared, without difficulty in analogy to known ones according to standard processes of synthetic organic chemistry (such as are described, for example, in Houben-Weyl-Müller, Methoden der Organischen Chemie, 4th Edition, 1960).

The dielectrics of this invention contain 2 to 15, preferably 3 to 12 components, among which is at least one anthraquinone dyestuff of formula (I). The other components are selected from the nematic or nematogenic substances in the classes of the azoxybenzenes, benzylideneanilines, biphenyls, terphenyls, phenyl or cyclohexyl benzoates, cyclohexanecarboxylic acid phenyl or cyclohexyl esters, phenylcyclohexanes, cyclohexylbiphenyls, cyclohexylcyclohexanes, cyclohexylnaphthalenes, 1,4-bis-cyclohexylbenzenes, 4,4'-bis-cyclohexylbiphenyls, phenyl- or cyclohexyl-pyrimidines, phenyl- or cyclohexyldioxanes, optionally halogenated stilbenes, benzyl phenyl ethers, tolanes adn substituted cinnamic acids. The most important compounds for use as such liquid crystalline host materials can be characterized by formula (V)

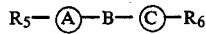

(V)

wherein A and C are each of a carbo- or heterocyclic ring system from the group of 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline; B is

| | |
|---|---|
| —CH=CH— | —N(O)=N— |
| —CH=CD— | —CH=N(O)— |
| —C≡C— | —CH₂—CH₂— |
| —CO—O— | —CH₂—O— |
| —CO—S— | —CH₂—S— |
| —CH=N— | |

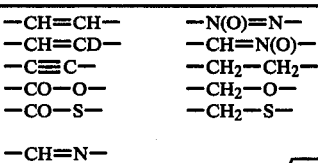

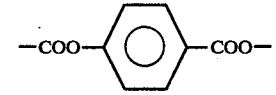

D is halogen, preferably chlorine, or —CN; and $R_5$ and $R_6$ are alkyl, alkoxy, alkanoyloxy, or alkoxy-carbonyloxy of up to 18, preferably up to 8 carbon atoms, or one of these residues also is —CN,—NC,—NO₂-,—CF₃,F,Cl or Br. In the case of most of these compounds, $R_5$ and $R_6$ differ from one another, and one of these residues is usually an alkyl or alkoxy group. However, other variants of the abovementioned substituents are also conventional. Many such substances or also mixtures thereof are commercially available.

The dielectrics according to this invention contain, as a rule, 0.1 to 15, preferably 0.5 to 10, especially 1–5 weight percent of one or more compounds of formula (I). The production of the dielectrics according to this invention takes place in a per se conventional manner. As a rule, the desired amount of the components employed in lesser amount is dissolved in the component making up the main constituent, expediently at an elevated temperature. If a temperature above the clear point of the main component is thereby chosen, the completeness of the dissolving can be observed especially easily.

However, it is also possible to mix solutions of the components of formulae (I) and, e.g., (V) in a suitable organic solvent, for example, acetone, chloroform or methanol, and, after thorough mixing, to remove the solvent, for example by distillation under reduced pressure. Of course, in the case of this procedure, care must be taken that no impurities or undesired doping materials are entrained by the solvent.

By means of suitable additives, the liquid crystalline dielectrics according to this invention can be so modified that they can be used in all previously known kinds of guest-host indicator elements. Such additives are known to the expert and are described in detail in the appropriate literature. For example, substances can be added to provide a cholestric structure as discussed above or for the alteration of the dielectric anisotropy, the viscosity, the conductivity and/or the orientation of the nematic phases. Such substances are described, for example, in published Federal Republic of Germany patent application Nos. 22 09 127, 22 40 864, 23 21 632, 23 38 281 and 24 50 088, whose disclosures are incorporated by reference herein.

Amounts of such ingredients and all other details of the use of the compounds, dielectrics and cells of this invention are fully conventional unless indicated otherwise herein.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in anyway whatsoever. In the following examples, all temperatures are set forth uncorrected in degrees Celsius; unless otherwise indicated, all parts and percentages are by weight.

In the Examples, m.p. means the melting point and K the clear point of a liquid crystalline substance in degrees Celsius; boiling temperatures are indicated with b.p.

EXAMPLE 1

(a) To a solution of 32.1 g of 4-amino-4'-(trans-4-n-pentylcyclohexyl)-biphenyl in 300 ml of glacial acetic acid is added at 50°, with stirring, 50 g of 65% aqueous nitric acid. After two hours of subsequent stirring, the reaction mixture is poured onto 1 kg of ice and the precipitated 4-acetamino-3-nitro-4'-(trans-4-n-pentylcyclohexyl)-biphenyl is filtered off, washed with water and transferred to a solution of 12 g of potassium hydroxide in 100 ml of ethanol. The reaction mixture is heated to the boil for 2 hours, poured into 500 ml of water and the 4-amino-3-nitro-4'-(trans-4-n-pentylcyclohexyl)-biphenyl is extracted therefrom with toluene. After distilling off the toluene, the residue is slurried in 40 ml of 50% aqueous sulphuric acid. After the addition of 20 ml of dioxane, a solution of 4.8 g of sodium nitrite in 25 ml of water is added dropwise at 0°. The resultant suspension is introduced into a solution of sodium tetracyanocuprate-(I) kept at 0° and prepared from copper (II) sulphate, sodium sulphite and sodium cyanide. Thereafter, it is further heated for 1 hr on a boiling waterbath. The cooled suspension is extracted several times with dichloromethane, the organic phase is washed with 2N aqueous sodium hydroxide solution and water and dried over sodium sulphate. After distilling off the solvent, the 3-nitro-4-cyano-4'(trans-4-n-pentylcyclohexyl)-biphenyl remaining behind is recrystalized from ethanol; m.p. 118°.

(b) A solution of 16 g of 3-nitro-4-cyano-4'-(trans-4-n-pentylcyclohexyl)-biphenyl in 100 ml of dioxane is carefully introduced into a solution of 29.0 g of tin (II) chloride in 25 ml of 37% hydrochloric acid, wherein the temperature must not exceed 45°. After 2 hours of stirring, the reaction mixture is slowly introduced into 200 ml of ice-cooled 30% aqueous sodium hydroxide solution. The 3-amino-4-cyano-4'-(trans-4-n-pentylcyclonexyl)-biphenyl thereby crystallizing out is filtered off, washed with water and recrystallized from ethanol. The so purified material is slurried in 40 ml of 50% sulphuric acid. After the addition of 20 ml of dioxane, the solution of 4.8 g of sodium nitrite in 25 ml of water is added dropwise at 0°. The resultant suspension is introduced into a solution of sodium tetracyanocuprate (I) kept at 0° and prepared from copper (II) sulphate, sodium sulphite and sodium cyanide. Thereafter, it is further heated for 1 hr. on a boiling waterbath. The cooled suspension is extracted several times with dichloromethane, the organic phase is washed with 2N aqueous sodium hydroxide solution and water and dried over sodium sulphate. After distilling off the solvent, the 4'-(trans-4-n-pentylcyclohexyl)-biphenyl-3,4-dicarbonitrile remaining behind is recrystallized from ethanol; m.p. 134°.

(c) 2 g of 4'-(trans-4-n-Pentylcyclohexyl)-biphenyl-3,4-dicarbonitrile is heated to the boil for 16 hours in a solution of 1.5 g of potassium hydroxide in 15 ml of amyl alcohol. Subsequently, the reaction mixture is poured into 25 ml of 5% aqueous hydrochloric acid, the 4'-(trans-4-n-pentylcyclohexyl)-biphenyl-3,4-dicarboxylic acid which crystallizes out is filtered off and heated to the boil with 2.5 ml of acetic acid anhydride and 0.5 g of zinc chloride for 1 hour. After cooling, the 4'-(trans-4-n-pentylcyclohexyl)-biphenyl-3,4-dicarboxylic acid anhydride which has crystallized out is filtered off, washed with a little cold water and dried under reduced pressure; yield 1.5 g.

(d) 1.2 g of 4'-(trans-4-n-pentylcyclohexyl)-biphenyl-3,4-dicarboxylic acid anhydride, 2.0 g of hydroquinone and 10 g of oxalic acid are heated for 2 hours to 220°. After cooling, the 1,4-dihydroxy-6-[4-(trans-4-n-pentylcyclo-hexyl)-phenyl]-anthraquinone obtained is purified by recrystallization from ethanol.

There are prepared analogously:
1,4-dihydroxy-6-(4-n-butylphenyl)-anthraquinone,
1,4-dihydroxy-6-(trans-4-n-propylcyclohexyl)-anthraquinone,
1,4-dihydroxy-6-(4-n-hexyloxyphenyl)-anthraquinone, and
1,4-dihydroxy-6-[4-(trans-4-ethylcyclohexyl)-cyclohexyl]anthraquinone.

EXAMPLE 2

0.7 g of 1,4-Dihydroxy-6-[4-(trans-4-n-pentylcyclohexyl)-phenyl]-anthraquinone is dissolved in 5 ml of pyridine and 50 ml of methylamine gas is passed into the solution. The resultant solution is heated for 16 hours to 90° and then poured into 50 ml of water. The mixture of the violet dyestuffs 1-N-methylamino-4-hydroxy-6-[4-trans-4-n-pentylcyclohexyl)-phenyl]-anthraquinone and 1-hydroxy-4-N-methylamino-6-[4-(trans-4-n-pentylcyclohexyl)-phenyl]-anthraquinone which crystallizes out is separated by column chromatography on silica gel (eluent: toluene).

There are prepared analogously:
1-N-methylamino-4-hydroxy-6-(4-n-butylphenyl)-anthraquinone and 1-hydroxy-4-N-methylamino-6-(4-n-butylphenyl)-anthraquinone;
1-amino-4-hydroxy-6-(trans-4-n-propylcyclo-hexyl)-anthraquinone; and
1-N-ethylamino-4-hydroxy-6-(4-n-hexyloxyphenyl)-anthraquinone and 1-hydroxy-4-N-ethylamino-6-(4-n-hexyloxyphenyl)-anthraquinone.

EXAMPLE 3

By the reaction of 1.5 g of phthalic acid anhydride with 2 g of (4-methylphenyl)-hydroquinone [prepared from p-toluidine and p-benzoquinone according to J. Amer. Chem. Soc., Volume 56 (1934), page 2478] analogously to Example 1 d), there is prepared 1,4-dihydroxy-2-(4-methylphenyl)-anthraquinone.

There are obtained analogously:
1,4-dihydroxy-2-(4-ethoxyphenyl)-anthraquinone,
1,4-dihydroxy-2-[4-(trans-4-n-propylcyclohexyl)-phenyl]-anthraquinone, and
1,4-dihydroxy-2-(4-n-pentylcyclohexyl)-anthraquinone.

EXAMPLE 4

Analogously to Example 2, from the dyestuffs prepared according to Example 3, there are obtained:
1-amino-4-hydroxy-2-(4-methylphenyl)-anthraquinone and 1-amino-4-hydroxy-3-(4-methylphenyl)-anthraquinone;

1-N-methylamino-4-hydroxy-2-(4-ethoxyphenyl)-anthraquinone and 1-N-methylamino-4-hydroxy-3-(4-ethoxyphenyl)-anthraquinone; and 1-N-ethylamino-4-hydroxy-2-[4-(trans-4-n-propylcyclohexyl)-phenyl]-anthraquinone and 1-N-ethylamino-4-hydroxy-3-[4-(trans-4-n-propylcyclohexyl)-phenyl]-anthraquinone.

The following Examples concern liquid crystalline dielectrics according to this invention:

EXAMPLE 5

In the liquid crystal mixture of
22% 4-(trans-4-n-propylcyclohexyl)-benzonitrile,
19% 4-(trans-4-n-butylcyclohexyl)-benzonitrile,
30% 4-(trans-4-n-pentylcyclohexyl)-benzonitrile,
15% 4-(trans-4-n-pentylcyclohexyl)-biphenyl-4'-carbonitrile and
14% 4-n-pentyl-4''-cyanoterphenyl, there are dissolved 3 parts by weight of the right-handed-helix-inducing 4-(2-methylbutyl)-biphenyl-4'-carbonitrile and 1 part by weight of 1-hydroxy-4-N-methylamino-6-[4-(trans-4-n-pentylcyclohexyl)-phenyl]-anthraquinone. With this dielectric, there can be achieved in CGH indicator elements with a layer thickness of 12 μm, very good contrasts between violet (cholesteric phase, planar, without electric field) and colorless (nematic phase, homeotropic, with electric field).

Similar results are obtained when, as dyestuff, there is used, for example, 1,5-diamino-4,8-dihydroxy-2-[trans-(4-n-pentylcyclohexyl)-phenyl]-anthraquinone or 1,5-bis-N-methylamino-2,6-bis-(4-n-pentylphenyl)-anthraquinone.

EXAMPLE 6

To the liquid crystal mixture of Example 5, there is added 0.5% of the dichroitic dyestuff 1-N-methylamino-4-hydroxy-6-[4-(trans-4-n-pentylcyclohexyl)-phenyl]-anthraquinone of Example 2. In this solution, the dichroitic dyestuff displays a dichroitic ratio of 11.1 and a degree of order S of 0.77.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

We claim:

1. A dichroitic dyestuff of the formula

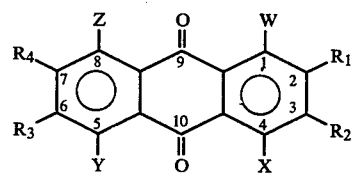

(I)

wherein W, X, Y and Z each is hydrogen, $NH_2$, OH, $NHCH_3$ or $NHC_2H_5$, provided that not more than 3 of these are the same, and one or two of $R_1$, $R_2$, $R_3$ and $R_4$ are a group of the formulae (IIa), (IIb), or (IIc)

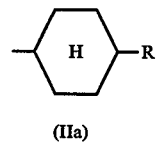

(IIa)

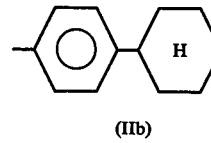

(IIb)

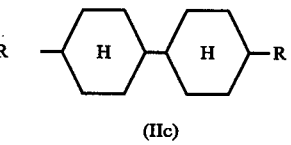

(IIc)

and the others are hydrogen, R being alkyl of 1–12 carbon atoms.

2. A compound of claim 1 wherein not more than two of W, X, Y and Z are OH or $NH_2$.

3. A compound of claim 1 wherein two of W, X, Y and Z are H and at least one is methylamino or ethylamino.

4. A compound of claim 1 wherein either W and X, or Y and Z are H.

5. A compound of claim 1 wherein one of $R_1$, $R_2$, $R_3$ and $R_4$ is cyclohexylphenyl of the formula (IIb) or cyclohexylcyclohexyl of the formula (IIc) and the other three are H, R being $C_{1-7}$-alkyl.

6. A compound of claim 1 wherein one of $R_1$, $R_2$, $R_3$ and $R_4$ is of the formula (IIb) or (IIc) and another is of the formula (IIa).

7. A compound of claim 1 wherein two of $R_1$, $R_2$, $R_3$ and $R_4$ are of the formulae (IIa), (IIb), or (IIc) and these two are located in the 2,6- or 3,7-position and the other two are H.

8. A liquid crystalline dielectric comprising guest dichroitic dyestuff and a host liquid crystalline component, wherein the guest dichroitic dyestuff comprises at least one dichroitic dyestuff of claim 1.

9. A liquid crystalline dielectric of claim 8 wherein the amount of dichroitic dyestuff is 0.1 to 15 wt. %.

10. In an electro-optical indicator element comprising a guest-host liquid crystal cell, the improvement wherein the liquid crystal cell contains a liquid crystalline dielectric of claim 8.

11. A compound of claim 1, wherein 1 or 2 of $R_1$, $R_2$, $R_3$ and $R_4$ are a group of the formulae (IIa) or (IIc).

12. A compound of claim 1, wherein 1 or 2 of $R_1$, $R_2$, $R_3$ and $R_4$ are a group of the formula (IIa).

13. A compound of claim 1, wherein 1 or 2 of $R_1$, $R_2$, $R_3$ and $R_4$ are a group of the formula (IIc).

14. A compound of claim 1, wherein 1 or 2 of $R_1$, $R_2$, $R_3$ and $R_4$ are a group of the formula (IIb) and R is of at least 3 carbon atoms.

15. A compound of claim 14, wherein R is straight chained.

16. A compound of claim 15, wherein R is n-propyl or n-pentyl.

17. A compound of claim 14, wherein R is branched with 1 chain branching.

18. A compound of claim 17, wherein R is $C_{2-12}$-alkyl substituted in the 1- or 2-position by methyl or is $C_{3-12}$-alkyl substituted in the 1- or 2-position by ethyl.

* * * * *